No. 663,646. Patented Dec. 11, 1900.
A. J. TAIT.
FILTER.
(Application filed May 22, 1900.)
(No Model.)
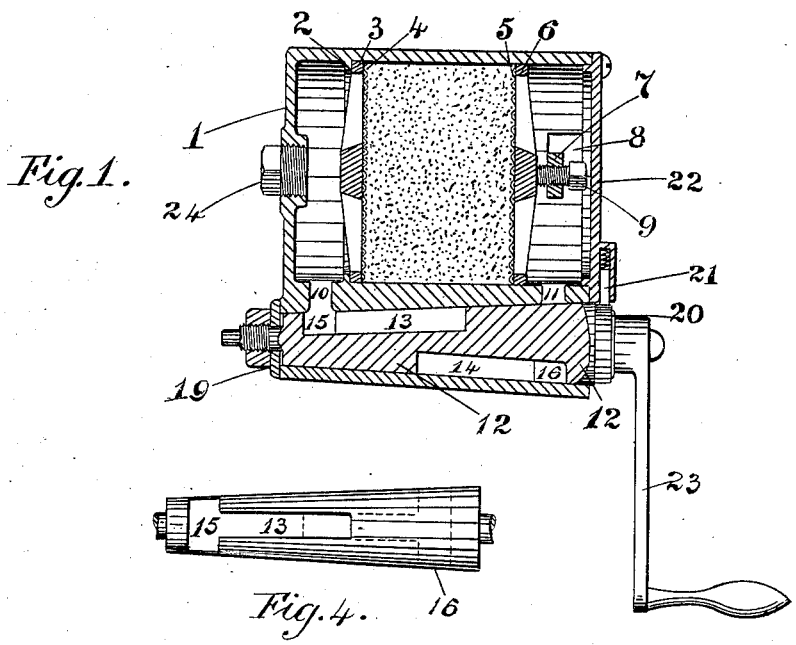
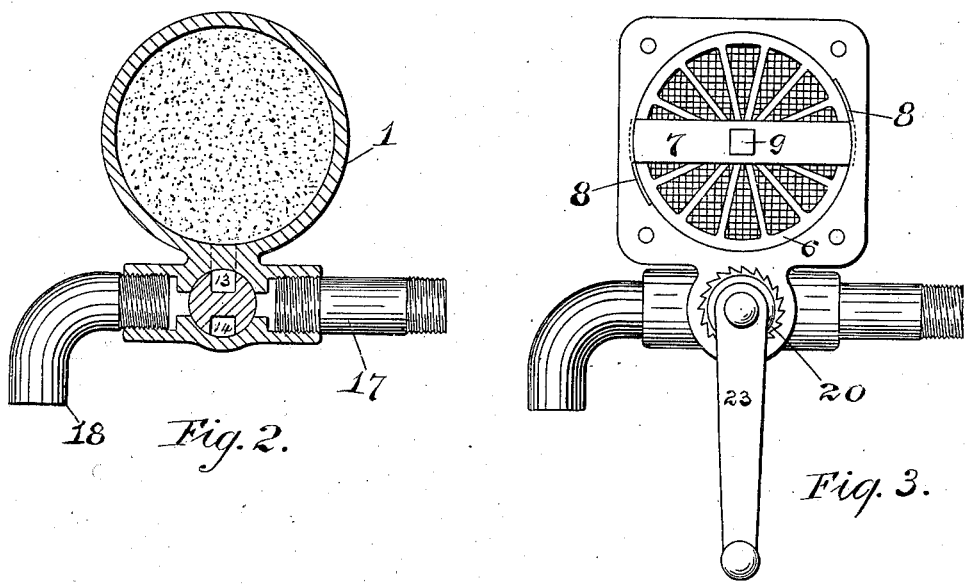
Witnesses:
Jesse R. Eoff.
William Knox.
Inventor:
Allen J. Tait
By W. J. Smyth
his atty.
THE NORRIS PETERS CO., PHOTO-LITHO., WASHINGTON, D. C.

UNITED STATES PATENT OFFICE.

ALLEN J. TAIT, OF OAKLAND, CALIFORNIA, ASSIGNOR TO DAN H. PRIEST, OF SAN FRANCISCO, CALIFORNIA.

FILTER.

SPECIFICATION forming part of Letters Patent No. 663,646, dated December 11, 1900.

Application filed May 22, 1900. Serial No. 17,607. (No model.)

*To all whom it may concern:*

Be it known that I, ALLEN J. TAIT, a citizen of the United States, residing at Oakland, in the county of Alameda and State of California, have invented certain new and useful Improvements in Filters; and I do hereby declare the following to be a full, clear, and exact description of the same.

This invention relates to the class of devices for purifying water by filtration through sand or through other granular or porous material. It is especially intended to be used in households or other circumstances wherein a comparatively limited amount of purified water is consumed.

The object of this invention is to provide a simple and inexpensive device of the character indicated which removes the impurities caught on the surface of the filtering material and which shall pass the water to be filtered through the filtering material in opposite directions at each operation of the filter. I accomplish these objects by means of the devices illustrated in the accompanying drawings, in which—

Figure 1 shows a transverse section of the device. Fig. 2 shows a side elevation, portions being in section to more clearly illustrate it. Fig. 3 is a similar elevation, the cover being removed. Fig. 4 is a view of a portion of the faucet-plug, showing the form of the passages.

Referring to the drawings, 1 is a receptacle, preferably of cylindrical form, for sand or other filtering or purifying material and provided with a shoulder 2 a short distance from one of its ends. Upon this shoulder 2 rests a spider or perforated disk 3, upon or against which is placed a suitable screen 4 of any suitable material. At some distance from 3 and 4 is located a substantially similar screen and spider 5 and 6, respectively, the intervening space being filled with sand or other granular material or porous filtering or purifying material. The spider 6 is held in place by a yoke 7, extending diametrically across the cylinder, its ends resting in suitable sockets or recesses 8, which are shown clearly in Figs. 1 and 3. In this form a groove permits the entrance of the yoke 7, the recess being undercut to form the socket for the yoke.

In this yoke is a set-screw 9, which bears against the center of the spider or disk, and by means of this set-screw pressure may be brought to bear on the filtering material to hold it snugly in place or slightly compress it, if desired.

The construction just described leaves the cylinder with a vacant space at each end, as shown in Fig. 1, and from each of these spaces is a port or passage, (marked in the drawings 10 and 11.)

Axially parallel and at one side of the cylinder is a faucet-plug of somewhat peculiar construction fitted into a suitable faucet integral with or attached to the cylinder. This faucet-plug 12 is formed, as shown in Figs. 1, 2, and 4, with longitudinal grooves 13 and 14, each of which has a transverse groove at one of its ends, as shown in Fig. 4, and which are marked 15 and 16. These transverse grooves are suitably spaced apart so as to coincide each with one of the ports 10 and 11 of the filtering-cylinder, while at the same time the longitudinal groove of each communicates, respectively, with the inflow and outflow pipe 17 and 18 of the faucet. The plug is movably secured in place by any suitable means. I have shown a nut and washer 19 for this purpose.

Preferably on the opposite end of the plug from the nut and washer is formed a ratchet 20, (shown in Figs. 1 and 3,) and a suitable spring-actuated pawl 21, engaging therewith, is also provided. For convenience this pawl is attached to and forms part of a cover 22, which is fitted with a water-tight joint on the end of the cylinder 1 by any suitable means. A suitable handle 23 is placed on the plug to operate it. On the opposite end from the cover a plug 24 is provided, obviating the necessity of a separate cover for this end of the device to provide for inspection of the outer surface of the filtering-screens.

By the peculiar character of the faucet-plug and the ratchet-and-pawl-controlling device the water from inlet 17 is directed alternately to each end of the cylinder 1 through the ports 10 and 11 by each operation of the handle, a quarter-turn being necessary to turn it full on and a quarter-turn in the same direction being required to shut it off again, and so on.

It will thus be seen that in operation the water to be purified passes into the clean end of the filtering material, and its first action is to carry out any impurities which may have been deposited on the surface of the other end of the filtering material, so that it is possible by permitting a small quantity of the first flow of water to run to waste to carry therewith practically all the impurities which may have been taken from previously-drawn water and thereafter draw clean purified filtered water which has not passed the accumulation of previous filterings.

Having now described my invention, what I claim as new, and desire to secure by Letters Patent, is—

1. A water-purifying device comprising a non-rotative receptacle adapted to contain suitable filtering material and a faucet connected therewith provided with means whereby water is conducted alternately to each end by successive operations of said faucet and means adapted to insure the rotation of the faucet in one direction.

2. A water-purifying device comprising a non-rotative receptacle adapted to contain suitable filtering material and a faucet exterior to said receptacle, connected therewith provided with means whereby water is conducted alternately to each end by successive operations of said faucet and means adapted to insure the rotation of the faucet in one direction.

3. A water-purifying device comprising a receptacle adapted to contain suitable filtering means comprising the spiders or perforated partitions 3 and 6 with the screens 4 and 5 and the granular or porous material interposed between them and means for removably holding them in place and the faucet exterior to a receptacle adapted to conduct water alternately to either end of the filtering material by successive operations of the faucet and means adapted to insure the rotation of the faucet in one direction.

ALLEN J. TAIT.

Witnesses:
JESSE R. EOFF,
WILLIAM KNOX.